(12) United States Patent
Schrijen et al.

(10) Patent No.: US 12,353,426 B2
(45) Date of Patent: Jul. 8, 2025

(54) ASSIGNING DEVICE

(71) Applicant: Synopsys, Inc., Sunnyvale, CA (US)

(72) Inventors: Geert Jan Schrijen, Roermond (NL); Derk Jan Meuleman, Kessenich (BE)

(73) Assignee: Synopsys, Inc., Sunnyvale, CA (US)

( * ) Notice: Subject to any disclaimer, the term of this patent is extended or adjusted under 35 U.S.C. 154(b) by 310 days.

(21) Appl. No.: 17/867,890

(22) Filed: Jul. 19, 2022

(65) Prior Publication Data

US 2022/0365927 A1 Nov. 17, 2022

Related U.S. Application Data

(63) Continuation of application No. 15/777,305, filed as application No. PCT/EP2016/076716 on Nov. 4, 2016, now Pat. No. 11,429,624.

(30) Foreign Application Priority Data

Nov. 20, 2015 (EP) ..................................... 15195585

(51) Int. Cl.
| | |
|---|---|
| G06F 16/2458 | (2019.01) |
| G09C 1/00 | (2006.01) |
| H04L 9/06 | (2006.01) |
| H04L 9/32 | (2006.01) |

(52) U.S. Cl.
CPC ........... G06F 16/2468 (2019.01); G09C 1/00 (2013.01); H04L 9/3278 (2013.01); H04L 9/0643 (2013.01); H04L 2209/12 (2013.01); H04L 2209/26 (2013.01)

(58) Field of Classification Search
CPC . G06F 16/2468; H04L 9/3278; H04L 9/0643; H04L 2209/12; H04L 2209/26; G09C 1/00
See application file for complete search history.

(56) References Cited

U.S. PATENT DOCUMENTS

| | | | |
|---|---|---|---|
| 8,386,990 B1 * | 2/2013 | Trimberger | ........... H01L 23/544 |
| | | | 326/38 |
| 8,516,269 B1 * | 8/2013 | Hamlet | ................. G06F 21/445 |
| | | | 713/180 |
| 8,667,265 B1 | 3/2014 | Hamlet | |
| 2003/0204743 A1 | 10/2003 | Devadas et al. | |
| 2009/0083833 A1 | 3/2009 | Ziola | |

(Continued)

FOREIGN PATENT DOCUMENTS

| | | |
|---|---|---|
| CN | 101542496 A | 9/2009 |
| EP | 2 191 410 | 6/2010 |

(Continued)

OTHER PUBLICATIONS

International Search Report and Written Opinion of the ISA for PCT/EP2016/076716, mailed Feb. 7, 2017, 14 pages.

*Primary Examiner* — Kannan Shanmugasundaram

(74) *Attorney, Agent, or Firm* — Fenwick & West LLP

(57) ABSTRACT

An assigning device (100) for assigning fixed identifiers to fuzzy identifiers, the assigning device comprising a database storing multiple fuzzy identifiers, and a matching unit (130) arranged to determine if a matching fuzzy identifier exists in the database that matches a fuzzy input identifier according to a matching criterion and to determine if a matching fuzzy identifier does not exist in the database according to an absent criterion.

22 Claims, 11 Drawing Sheets

(56) References Cited

U.S. PATENT DOCUMENTS

| | | | |
|---|---|---|---|
| 2010/0250936 A1 | 9/2010 | Kusakawa et al. | |
| 2011/0055649 A1 | 3/2011 | Koushanfar et al. | |
| 2012/0290845 A1* | 11/2012 | Bares .................... | H04L 9/3278 |
| | | | 713/170 |
| 2014/0108786 A1* | 4/2014 | Kreft .................. | G06Q 20/3825 |
| | | | 713/194 |
| 2015/0101037 A1* | 4/2015 | Yang .................... | H04L 9/3278 |
| | | | 726/16 |
| 2015/0215115 A1 | 7/2015 | Pikus | |
| 2016/0105437 A1 | 4/2016 | Yokoyama et al. | |
| 2016/0227348 A1* | 8/2016 | Guo ..................... | G06F 21/445 |

FOREIGN PATENT DOCUMENTS

| | | |
|---|---|---|
| EP | 2 293 492 | 3/2011 |
| EP | 3 018 607 | 5/2016 |
| WO | 2007/116325 | 10/2007 |
| WO | 2009/024913 | 2/2009 |
| WO | WO 2009/079050 A2 | 6/2009 |
| WO | 2009/156904 | 12/2009 |
| WO | 2011/018414 | 2/2011 |
| WO | 2012/045657 | 4/2012 |
| WO | 2012/069545 | 5/2012 |
| WO | 2015/002271 | 1/2015 |

\* cited by examiner 310   10100111101101110010

| | 410 |
|---|---|
| 310 | 1010011110110111 0010 |

| | 420 |
|---|---|
| 310 | 1010011110110111 0010 |
| 422 | 011101 |

| | 430 |
|---|---|
| 312 | 1010010111110001 0010 |

| | 440 |
|---|---|
| 310 | 1010011110110111 0010 |
| 312 | 1010010111110001 0010 |

ASSIGNING DEVICE

This application is a continuation of U.S. application Ser. No. 15/777,305, filed 18 May 2018, which is the U.S. national phase of International Application No. PCT/EP2016/076716 filed 4 Nov. 2016, which designated the U.S. and claims priority to EP patent application Ser. No. 15/195,585.3 filed 20 Nov. 2015, the entire contents of each of which are hereby incorporated by reference.

FIELD OF THE INVENTION

The invention relates to an assigning device, an object identifying system, a testing system, an assigning method, a computer program and a computer readable medium.

BACKGROUND

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular predetermined identifier. The manufacturing variations lead to different physical characteristics, for example in a memory element. The physical characteristics may include: doping concentrations, oxide thickness, channel lengths, structural width (e.g. of a metal layer), parasitics (e.g. resistance, capacitance), etc. When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

For example, it has been observed that the startup behavior of some memory elements, e.g. SRAM, demonstrate PUF like behavior. When such memory is powered-up, it tends to contain content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content.

A PUF provides unpredictable and device-unique responses, yet due to their physical origin, these may be subject to measurement noise, and environmental influences. A PUF response that is on the hand sufficiently unique to identify the PUF, but on the other hand is subject to noise is called a fuzzy identifier.

Using a fuzzy identifier to identify objects, e.g., an object attached or otherwise associated with a PUF is problematic. An object identifier is preferably perfectly reliable. For example, using a fuzzy identifier as an index for searching in a database, e.g., to recover testing data such as a manufacturing date, will not work if the fuzzy identifier changes from measurement to measurement.

In the art, this problem has been addressed with so called helper-data. In an initial enrollment stage, an object identifier is derived from the PUF response. In the enrollment process, helper data for the PUF response is produced.

Helper data is able to transform a noisy fuzzy identifier into a reliable identifier. An error correction procedure can be used in this process to correct for the fluctuations, and make sure an identical digital identifier is derived, each time the PUF is used. An error correction procedure uses the helper data to remove the noise from the fuzzy identifier. Later on in the field, the reconstruction stage reevaluates the PUF response and uses the helper data from the enrollment stage to reconstruct the same object identifier. The helper data hence needs to be stored in between the enrollment and reconstruction stages with the PUF for which it was computed.

SUMMARY OF THE INVENTION

An assigning device is provided for assigning fixed identifiers to fuzzy identifiers. The assigning device comprises
a database storing multiple database records, each database record storing a fuzzy identifier,
a network interface arranged to receive a fuzzy input identifier,
a matching unit arranged to
determine if a matching fuzzy identifier exists in the database that matches the fuzzy input identifier according to a matching criterion, and thereupon sending a matching signal to a fixed identifier determining unit,
determine if a matching fuzzy identifier does not exist in the database according to an absent criterion, and thereupon sending an absent signal to a database adding unit,
the database adding unit arranged to receive the absent signal, and upon said receiving, to add a database record to the database, said added database record storing the fuzzy input identifier, and further to send the matching signal to the fixed identifier determiner, and
the fixed identifier determiner arranged to receive the matching signal, and upon said receiving to determine a fixed identifier from the database record storing the matching fuzzy identifier, wherein
the network interface is arranged to transmit the fixed identifier.

The assigning device allows the use of fuzzy identifiers even with conventional information processing systems that expect a fixed identifier. The assigning device may be used as a translation service that translates a fuzzy identifier to a fixed identifier. A user of the assigning device does not need to know if a fuzzy identifier has been registered before: If the assigning device finds a matching fuzzy identifier, a fixed identifier is returned. If the assigning device finds that no matching fuzzy identifier exists, a new record is added and a fixed identifier is also returned. Moreover, a user of the assigning device does not need to store any information such as helper data (error correcting data) to suppress noise in fuzzy identifiers.

In an embodiment, the absent criterion is satisfied if no matching fuzzy identifier exists in the database that matches the fuzzy input identifier according to the matching criterion, so that the matching unit either sends the matching signal or the absent signal for any fuzzy input identifier. Accordingly, the assigning device will always return a fixed identifier for a received fuzzy identifier. This makes the assigning device particularly easy to embed in existing infrastructure as a fixed identifier will always be available. In the description these types of embodiments are referred to as type 1 embodiments.

In an embodiment, the matching unit is arranged to
if no matching fuzzy identifier exists in the database that matches the fuzzy input identifier according to the matching criterion, determine if a nearly-matching fuzzy identifier exists in the database that is nearly-matching to the fuzzy input identifier according to a nearly-matching criterion, and if said nearly-matching fuzzy identifier exists, sending a resample-error message through the network interface.

the matching unit is arranged to, upon receiving the fuzzy input identifier, send at most one of the matching signal, nearly-matching signal or absent signal.

In the description these types of embodiments are referred to as type 2 embodiments. In certain rare cases a type 1 embodiment can end up in a situation in which multiple fuzzy identifiers match a fuzzy input identifier. Such ambiguous situations are undesirable. The probability such ambiguity occurring in a type 1 embodiment can be made as low as desired by increasing the length of the fuzzy identifiers. Nevertheless, it is desired to have an alternative way to avoid these situations. In a type 2 embodiment potential problems are shifted from the matching of fuzzy identifiers to the adding of fuzzy identifiers. During adding different options are available to deal with this problem.

In an embodiment, the matching unit is arranged to
upon determining that the matching fuzzy identifier exists in the database, store the fuzzy input identifier in the database record storing the matching fuzzy identifier,
the matching unit being arranged to use said stored fuzzy input identifier for future determinations of matching and existence.

A fuzzy identifier will not be exactly the same if it is obtained multiple times, e.g., due to noise. However, a PUF may also be subject to drift, e.g., due to a process called ageing. Due to drift a fuzzy identifier may slowly change into a different fuzzy identifier, which in turn impedes matching. By performing matching relative to the latest fuzzy identifier failed matches due to drift is avoided.

In an embodiment, the database is arranged to store both an original fuzzy identifier stored in the database record by the database adding unit in response to the absent signal, and the stored fuzzy input identifier, the assigning device comprising a drifting unit arranged to determine a distance between the original fuzzy identifier and the stored fuzzy input identifier, if said distance is above a drifting threshold sending a drifting-error message. The stored fuzzy input identifier may be stored as a result of a previous matching operation.

If drift becomes too large, it may be an indication that the corresponding PUF has become unreliable. By signaling this situation appropriate measures may be taken, e.g., replacing the PUF.

An aspect of the invention concerns an object identifying system. The system comprises
an assigning device,
a reader arranged to read fuzzy identifiers from physical unclonable functions, a fuzzy identifier identifying a physical unclonable function and being subject to noise, the physical unclonable functions being associated with objects,
the reader comprising
a network interface arranged to
send a read fuzzy identifier as a fuzzy input identifier to the network interface of the assigning device and receive the fixed identifier therefrom.

The object identifying system can store and retrieve information for objects using fixed identifiers even though the objects only provide a fuzzy identifier.

The assigning device and readers are electronic devices. The objects may also be electronic devices, e.g., containing a PUF. The assigning device may also be applied to fuzzy identifiers that are obtained from biometrics.

The method of assigning described herein may be applied in a wide range of practical applications. Such practical applications include object tracking, testing, data storage, and retrieval etc. Object tracking may be used, e.g., in testing, in counterfeiting prevention etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of an assigning device, FIG. 2*a* schematically shows an example of an embodiment of an object identifying system, FIG. 2*b* schematically shows an example of an embodiment of a testing system, FIG. 3 schematically shows examples of fuzzy identifiers, FIG. 4 schematically shows examples of database records, FIG. 5*a* schematically shows a flowchart illustrating an example of an embodiment of an assigning method, FIG. 5*b* schematically shows a flowchart illustrating an example of an embodiment of an assigning method, FIG. 6*a* schematically shows a computer readable medium having a writable part comprising a computer program according to an embodiment, FIG. 6*b* schematically shows a representation of a processor system according to an embodiment.

LIST OF REFERENCE NUMERALS IN FIGS. 1-3

Figure 1:
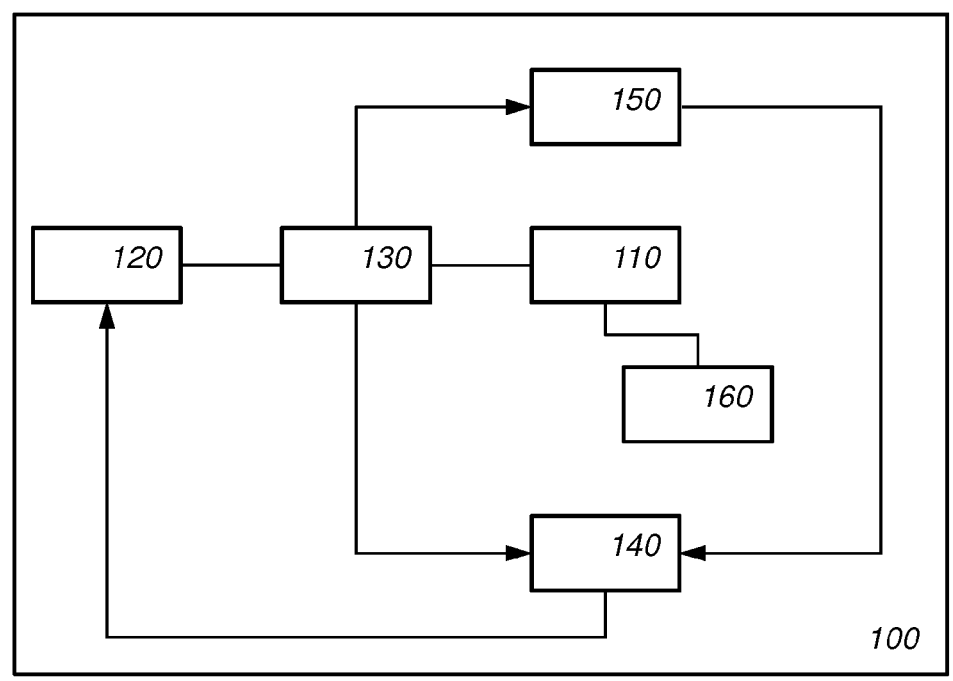

100 an assigning device
110 a database
120 a network interface
130 a matching unit
140 a fixed identifier determining unit
150 a database adding unit
160 a drifting unit
200 an object identifying system
210, 220, 230 an object
212, 222, 232 a physical unclonable function
250, 252 a reader
253 testing device
254 retrieving device
255 a database
262, 264 a first connection
263, 265 a second connection
251 a network interface
310-332 a fuzzy identifier

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Figure 2A:
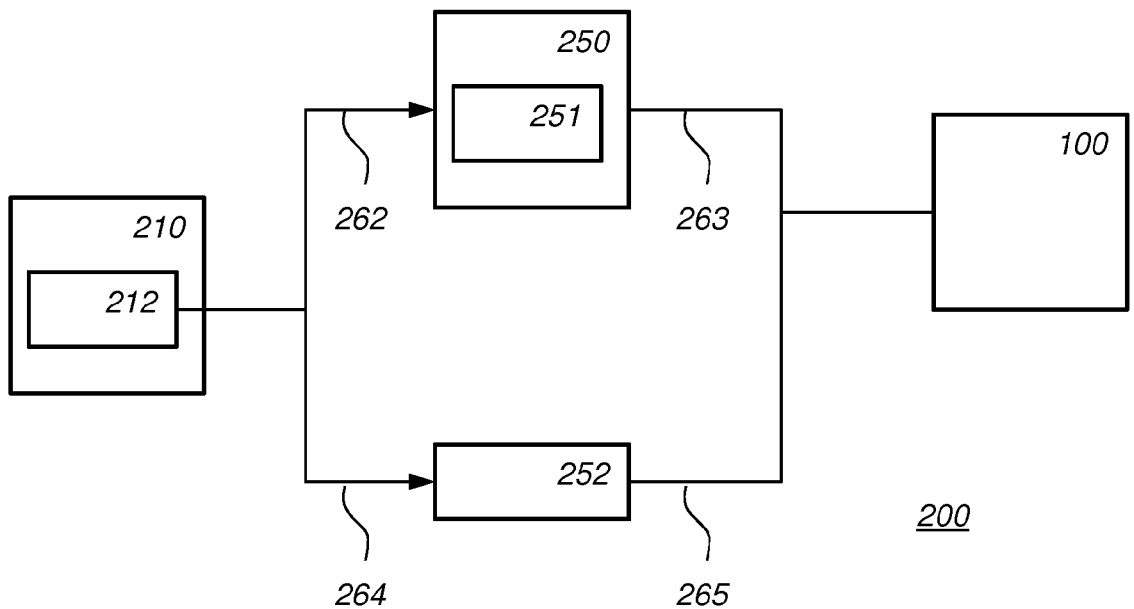
Figure 2A:
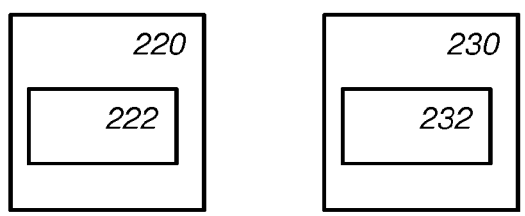

FIG. 1 schematically shows an example of an embodiment of an assigning device 100. Applications of assigning device 100 include an object identifying system 200. An example of an embodiment of an object identifying system 200 is schematically shown in FIG. 2a. FIG. 3 schematically shows examples of fuzzy identifiers.

Assigning device 100 is arranged to assign a fixed identifiers to a fuzzy identifier. A fuzzy identifier identifies its source yet at the same time is subject to noise, e.g., two fuzzy identifiers from the same source are likely to be close. More formally, it is less likely than a probability bound, that two fuzzy identifiers from the same source differ more from each other than a first threshold. The probability bound may depend on the application; say, the bound may be $10^{-6}$.

Although the identifying aspect of a fuzzy identifier is desirable, the fact that it is also subject to noise makes applications of fuzzy identifiers problematic. For example, a fuzzy identifier cannot be used in the place of object identifiers in an existing infrastructure if the latter expects the object identifiers to be unique and fixed, e.g., not subject to noise.

One particular important source of fuzzy identifiers are physical unclonable functions (PUFs). Object identifying system 200 can identify objects associated with a physical unclonable function. FIG. 2a shows three such objects 210, 220 and 230, comprising the respective physical unclonable functions 212, 222 and 232.

Physical Unclonable Functions

PUFs 212-232 are arranged to produce a fuzzy identifier. Below we will describe PUF 212. PUFs 222 and 232 may be similar. The PUF responses, e.g., the fuzzy identifier, may be encoded as a bit string. As the fuzzy identifier is noisy, so is the bit string. A fuzzy identifier is also referred to as a noisy bit string. Each time the fuzzy identifier is obtained from the PUF, it may differ slightly from a previously produced fuzzy identifier.

PUF 212 may be designed so that a first and second fuzzy identifier produced by PUF 212 are sufficiently close to each other, e.g., have a distance below a first threshold, e.g., the Hamming weight of their XOR difference is less than a first threshold. Moreover, the PUFs in the system are designed so that a first and second fuzzy identifier produced by two different PUFs, e.g. PUF 212 and 222 differ sufficiently from each other, e.g., the Hamming weight of their XOR difference is more than a second threshold.

In a single object identification system, all used PUFs are typically of the same type. The latter is not strictly necessary though, so long as the fuzzy identifiers are identifying within the system.

The amount of change between subsequently produced fuzzy identifiers by the same PUF differs between different types of PUF. The amount of change typical for the type of PUF influences a desired length of the PUF. If the amount of change is small, e.g., the fuzzy identifiers have low noise, a shorter bit string may be needed, if the amount of change is larger, a longer bit string.

PUF 212 may require a power-cycle, e.g., a power-down followed by a power-up to produce the fuzzy identifier again.

PUFs are bound to a physical device in such a way that it is computationally infeasible to predict the output of the function without actually evaluating the PUF using the physical device. Furthermore, as the PUF is realized by a physical system it is hard to clone. Physical systems that are produced by a production process that is not fully controlled (i.e. that contains some randomness) turn out to be good candidates for PUFs. In an embodiment, PUF 212 and thus object 210 may be uniquely identified based on the response provided by PUF 212, and the fixed identifier derived therefrom. The fuzzy identifier may be uniquely identifying within a group of objects; for example, devices of the same brand or model, etc.

The PUF's physical system is designed such that it interacts in a complicated way with stimuli and leads to unique but unpredictable responses. The stimuli of a PUF are referred to as the challenge. Some PUF allow a larger range of different challenges, producing different responses. A PUF challenge and the corresponding response are together called a Challenge-Response-Pair. However, a PUF may also have a single challenge. PUF 212 may be a single-challenge PUF. PUF 212 may also be a multiple-challenge PUF. In the latter case, PUF 212 is challenged with the same challenge or set of challenges when producing the fuzzy identifier.

A suitable source of PUFs are formed by an electronic volatile memory that contains, upon power-up, a response pattern of power-up values useful for identification of the memory, the response pattern depending on physical characteristics of the memory elements.

One known example of a PUF used to uniquely identify a device is the so-called SRAM PUF, which is based on the fact that, when an SRAM cell is started-up it starts up in a random state due to variations in the threshold voltages of the transistors, which, in turn, are due to doping variations. When this is done multiple times, each cell will start up in the same state most of the time. These PUFs may be realized on any device having SRAM memory on board.

Any memory showing a random start-up behavior which is sufficiently stable for identifying the memory is called a challengeable memory. As the start-up behavior is random, two different memories will have a large difference in their start-up memory pattern; as the start-up behavior is stable two start-up memory patterns of the same memory will have a small difference. Examples of such memories are SRAM memory cells as mentioned but also memory elements like flip-flops. Actually, any type of volatile memory may be used that comprises feedback loops. SRAM PUFs of this kind are described in more detail in patent publication WO/2007/116325.

A second kind of SRAM based PUFs can be constructed with Dual Port RAM. By writing on both ports at the same time different information, the memory cell is brought into an undefined state and shows a PUF-like behavior. This kind of PUF is described in more detail in WO2009024913. Other so—called Intrinsic PUFs are based on delay phenomena, see, e.g., US20030204743. A PUF may be constructed by simulating an SRAM memory cell on an FPGA, e.g., by cross-coupled invertors or latches, the so-called butterfly PUF see European patent EP2191410 B1 and WO2011018414A2. PUF 212 may be a physical unclonable function comprising a plurality of bus-keepers, e.g., as described in WO2012069545 or flip-flops (WO/2012/045627).

An optical physically unclonable function is described in US2015/0215115 A1. For example, the optical physically unclonable function may be read by a photonic circuit including an optical interferometer or an optical ring resonator.

A further example of a PUF is a coating PUF. A coating is applied to an integrated circuit. The capacitance induced by the coating varies across its surface due to a random distribution of dielectric particles inside it. Measuring the capacitance at different places of the coating gives different values. The measured values may be mapped to digital, e.g. bit-wise, values. An advantage of coating PUFs is that they are relatively reliable and require only little error-correction.

An oscillation based PUF circuit may comprise a number of identically laid-out delay loops (ring oscillators), which oscillate with a particular frequency. Due to manufacturing variation each ring oscillates at a slightly different frequency. In order to generate an output bit, two rings are selected and their frequencies compared. A k-bit output can be created by selecting k different oscillator pairs, e.g., on the basis of a challenge input.

For example, a reader such as readers 250, and 252 may be arranged to read a fuzzy identifier from physical unclonable functions. The type of reader depends on the type of PUF. For example, to read an optical PUF, an optical reader may be used, e.g., an optical interferometer, etc. To read a digital memory based PUF, the reader may be arranged to connect to a digital circuit of the PUF to receive, e.g., read, the fuzzy identifier. For example, the PUF may comprise reading circuitry arranged to read the contents of the PUF. In the latter case reader 250 may be arranged to receive the fuzzy identifier from the PUF.

Returning to FIG. 1; Assigning device 100 comprises a network interface 120 arranged to receive a fuzzy input identifier. For example, network interface 120 may be arranged to receive the fuzzy input identifier over a computer network, e.g., a LAN, the Internet, and the like. The network interface may be arranged for wired or wireless reception, etc. The device from which network interface 120 receives the fuzzy input identifier, is referred to as the requesting device. For example, readers 250, and 252 are requesting devices.

In an embodiment, the fuzzy identifier received by network interface 120 has been obtained from a PUF. For example, the PUF can be comprised in an object or otherwise associated therewith. A fuzzy identifier may also be a biometric identifier, or a biometric for short. A biometric identifier is measured from measurable characteristics of an individual, e.g., an animal, e.g., a human, that identifies said individual. Examples include, but are not limited to fingerprint, palm veins, face recognition, DNA, palm print, hand geometry, iris recognition, and retina. Like the fuzzy identifiers obtained from PUFs, a biometric identifies yet is subject to noise. For reasons of exposition, we will explain assigning device 100 as if the fuzzy identifier were obtained from a PUF. An object identifying application will be used to further explain assigning device 100; however assigning device 100 may also be used with biometrics, e.g., in an individual identifying system. For example, an individual identifying system (200) may comprise an assigning device and a reader arranged for reading the biometric identifier.

Assigning device 100 is arranged to assign a fixed identifier to a fuzzy identifier received over network interface 120. The fixed identifier also identifies the object or individual but is not subject to noise. The fixed identifier may be used in legacy infrastructure that has not been adapted for fuzzy identifiers. For example, the fixed identifier may be used as key under which to store and retrieve information, in particular information regarding the identified object.

Assigning device 100 comprises a database 110 storing multiple database records. Each database record stores a fuzzy identifier. For example, database 110 may be implemented as a database unit. Database 110 may be arranged in various formats. The data base may be of an advanced type, say based on MySQL, or the like. However, database 110 may also be considerably simpler. For example, the database may be a table, in which rows correspond to records. One column of the table contains fuzzy identifiers. For example, the database, e.g., in the form of such a table may be stored in a digital format. FIG. 4, which is more fully described below shows various examples of records for database 110. FIG. 4 shows numbers in a binary format. Other representations of numbers are possible. Moreover, the fuzzy identifier may comprise one or more real numbers, represented, e.g., as floating or fixed point number.

Assigning device 100 comprises a matching unit 130. Matching unit 130 searches for the fuzzy input identifier in database 110. Matching unit 130 is arranged to take into account that the fuzzy identifier may be different each time it is received. Interestingly, the criterion that matching unit 130 uses to establish that the fuzzy input identifier exists in the database may differ from the criterion that matching unit 130 uses to establish that the fuzzy input identifier does not exist in the database.

Matching unit 130 is arranged to determine if a matching fuzzy identifier exists in the database that matches the fuzzy input identifier according to a matching criterion, and thereupon sending a matching signal to a fixed identifier determining unit 140. In case the match is found, the matching fuzzy identifier has been stored previously in the database; possibly by assigning device 100 itself. Database 100 may also have been wholly or partially filled by a different device, e.g., a different assigning device cooperating with assigning device 100 to fill database 110.

Fixed identifier determiner 140 of assigning device 100 is arranged to receive the matching signal from the matching unit 130 and upon said receiving to determine a fixed identifier from the database record storing the matching fuzzy identifier. Due to noise, the matching fuzzy identifier need not be identical to the fuzzy input identifier, although it may. There are a number of ways in which the fixed identifier may be derived, which are discussed more fully below. Network interface 120 is arranged to transmit the fixed identifier.

In an embodiment, the fixed identifier is returned by network interface 120 to the same device that sent the fuzzy input identifier to network interface 120. In the latter case, the requesting device can read the fuzzy input identifier, and use the assigning device 100 as a translating service, to translate the fuzzy input identifier to a fixed identifier. After receiving the fixed identifier, the requesting device can continue to use the fixed identifier as if it had read the fixed identifier instead of the fuzzy identifier.

Matching unit 130 is further arranged to determine if a matching fuzzy identifier does not exist in the database according to an absent criterion, and thereupon sending an absent signal to a database adding unit 150.

Database adding unit 150 is arranged to receive the absent signal, and upon said receiving, to add a database record to the database, said added database record storing the fuzzy input identifier, and further to send the matching signal to the fixed identifier determiner. Thus if matching unit 130 determines that the fuzzy input identifier is absent from database 110, a database record is added for the fuzzy input identifier. Interestingly, for the requesting device this may be transparent. The requesting device receives a fixed identifier in both cases, i.e., both in case matching unit 130 determined that a matching fuzzy identifier exists in database 110, and in case matching unit 130 determined that a matching fuzzy identifier does not exist in database 110.

This property of assigning device 100 makes it possible to use fuzzy identifiers as a replacement for fixed identifiers. At the requesting device no knowledge is needed of enrollment or reconstruction phases. Furthermore, assigning device 100 does not require the storage of any information at either the PUF or at the requesting device. In particular no storage of so-called helper data (error-correcting data) is needed. The latter is important, as many objects either lack the ability for long term storage, or may need to produce an identifier at moments at which there is no opportunity for writing such data is available, e.g., if the PUF is read during manufacture, at which moment the device may not have the capability, resources or time to store such helper data. For example, the objects may be chips still in an un-cut wafer. In this situation PUFs comprised in the chips may be read out, though writing data to the chips is not convenient.

In an embodiment, the fixed identifier determiner 140 and database adding unit 150 may be integrated with the matching unit 130. Other architectures are also possible; for example, database adding unit 150 may be integrated with database 110 into a database unit, etc.

The matching unit may be arranged with a distance function to compute the matching and/or absent criterion. The distance function takes as input two fuzzy identifiers and produces a value that indicates their distance. A distance function is indicated with a lowercase d. The distance function satisfies $d(x,y) \geq 0$ with equality if and only if $x=y$. Distance functions may be symmetric ($d(x,y)=d(y,x)$), or asymmetric. Below we assume that the distance function is symmetric unless otherwise indicated.

For example, the distance function may be the so-called hamming distance. The hamming distance is particularly advantageous for PUFs that are naturally represented as bit strings, e.g., memory based PUF. Even if the natural data format of a PUF are not bits, in an embodiment, a PUF response is digitized to produce a binary fuzzy identifier represented as a bit string.

Different distance functions may be used for different PUFs. For example, for a coating PUF the Euclidean distance between two sequences $x_i$ and $y_i$ of capacitance measurement at different places of the coating may be used: $d(x,y)=\sqrt{\Sigma_i(x_i-y_i)^2}$. Herein x and y are the sequences of real positive numbers $x_i$ and $y_i$.

Instead of Euclidean distance other distances may be used, e.g., Manhattan distance. Also two distance functions $d_1$ and $d_2$ may be combined, e.g., as $d_1+d_2$. The latter may be useful if two different types of PUFs are combined, e.g., a memory based PUF and a coating PUF, e.g., to improve identification of the same object.

A distance function need not satisfy the triangle inequality, For example, the so-called squared Euclidean distance does not satisfy the triangle inequality. Below, it will be explained that using a distance function that does satisfy the triangle inequality may have advantages.

In an embodiment, the matching criterion is satisfied if a distance between the matching fuzzy identifier and the fuzzy input identifier according to a distance function is less-or-equal than a matching threshold.

The length of the fuzzy identifier, e.g., implemented as a noisy bit string, may be chosen so that a fuzzy input identifier, either clearly matches one particular matching fuzzy identifier, or clearly does not match any fuzzy identifier stored in the database with high probability. For example, this may be achieved by using a PUF that produces a long fuzzy identifier. For example, the PUF output may be doubled in length by doubling the PUF capacity. For example, if the PUF is a memory based PUF, the amount of memory may be doubled, thus increasing its identifying power.

Nevertheless, even if assigning device 100 is configured such that no ambiguity is likely to occur in practice, the assigning device 100 is preferably arranged to deal with ambiguity should it occur. Moreover, practically avoiding ambiguity may require longer fuzzy identifiers than is desirable. For some applications of assigning device 100, the cost of a misidentification may be comparatively small. In such cases, the length of the fuzzy identifiers may be shorter than required to completely rule out ambiguity. For example, if an assigning system is used for quality assurance, it may be acceptable if occasionally, no or a wrong fixed identifier is produced. There is thus a desire for assigning device 100 to have a well defined behavior in ambiguous situations. Below two different types are formulated for assigning device 100 in difficult situations.

In a first type, the absent criterion is satisfied if no matching fuzzy identifier exists in the database that matches the fuzzy input identifier according to the matching criterion, so that the matching unit either sends the matching signal or the absent signal for any fuzzy input identifier. This embodiment has the advantage that the requesting device always receives a fixed identifier in response to its request. This embodiment is further illustrated with reference to FIG. 3.

FIG. 3 gives various examples of fuzzy identifiers. In the examples of FIG. 3, fuzzy identifiers are bit strings of a fixed length—in the examples the bit string length is 20 bit. The matching criterion is satisfied if a distance between the matching fuzzy identifier and the fuzzy input identifier according to a distance function is less-or-equal than a matching threshold. In this example, the distance function is the Hamming distance. In the examples related to FIG. 3 the matching threshold is 4. For clarity of exposition, in all fuzzy identifiers in FIG. 3, the bits that differ with fuzzy identifier 310 are underlined so that the Hamming distance to fuzzy identifier 310 may be easily determined.

Below we explain what happens if the fuzzy identifiers 310, 320, 312, 330 and 332 are received as fuzzy input identifiers in that order when the matching unit 130 is configured as in the first type defined above, which always returns a fixed identifier. We assume the database is initially empty, but the same principles apply if the database contains multiple records.

Fuzzy ID 310: Matching unit 130 does not find a matching fuzzy identifier and sends the absent signal to database adding unit 150, which in turn will add a first record containing fuzzy identifier 310. Database adding unit 150 sends a matching signal to the fixed identifier determiner 140. The fixed identifier determiner 140 determines a fixed identifier based on the added first record.

Fuzzy ID 320: Matching unit 130 determines that the distance with fuzzy identifier 310 is 9. As this is more than the matching threshold 4, no matching fuzzy identifier exists, and thus a second record is a record is added for fuzzy identifier 320. A fixed identifier is returned based on the second record.

Fuzzy ID 312: Matching unit 130 determines that the distance with fuzzy identifier 310 is 4. Thus a matching fuzzy identifier exists in the database that matches the fuzzy input identifier. Matching unit 130 sends a matching signal to a fixed identifier determining unit 140. Fixed identifier determiner 140 sends a fixed identifier based on the first record.

Fuzzy ID 330: Matching unit 130 determines that the distances with fuzzy identifiers 310 and 320 are 6 and 11 respectively, thus both larger than the matching threshold. Accordingly a third record is added for fuzzy ID 330. A fixed identifier is determined from the third record.

Fuzzy ID 332: The distances between fuzzy ID 332 and the fuzzy IDs 310 and 330 are both less than the matching threshold. In this case an ambiguous situation arises; there are two fuzzy identifiers in database 110 that match the fuzzy input identifier.

There are various ways in which an assigning device 100 of the first type could deal with this ambiguity. For example, in an embodiment, fixed identifier determiner 140 may be arranged to use the first record storing a matching fuzzy identifier; for example, the first matching fuzzy identifier in the database or the matching fuzzy identifier which is lexicographically first, etc.

Alternatively, in an embodiment, fixed identifier determiner 140 may be arranged to use the first record storing the closest match, e.g., storing a matching fuzzy identifier having the smallest distance to the fuzzy input identifier. In the example, this criterion would not make a difference, as both matching identifiers have distance 3. However in general, especially with a larger bit string lengths and a higher matching threshold this criterion will often—though not always—break ties in the correct manner, so that a fuzzy input identifier gets the correct fixed identifier assigned.

As shown above assigning device 100 of the first type can get in the situation that there are multiple fuzzy identifiers stored in the database that match a given fuzzy input identifier.

In assigning device 100 of the second type it is avoided that the database contains fuzzy identifiers that are very close to each other. Making the fuzzy identifiers sufficiently long will also avoid that fuzzy identifiers occur that are very close to each other, however the latter solution may not be desirable, e.g., because it would lead to increased resource usage.

An assigning device 100 of the second type uses a different criterion for establishing that a matching fuzzy identifier exists than for establishing that a matching fuzzy identifier does not exist. Thus there exists the possibility that a given fuzzy input identifier neither satisfies the matching nor the absent criterion. Such a fuzzy input identifier is said to be nearly matching. A likely cause of a nearly matching identifier is that the source of the fuzzy input identifier for some reason had a bit higher than usual noise rate. For example, some fluctuations in the environment of the source may have caused this. For example, some PUFs are known to have an increased noise level if the temperature increases. If a new record is added for the nearly matching identifier this may later cause multiple matching fuzzy identifiers.

In an embodiment, matching unit 130 is arranged to determine if a nearly-matching fuzzy identifier exists in the database that is nearly-matching to the fuzzy input identifier according to a nearly-matching criterion. The matching unit is arranged to, upon receiving the fuzzy input identifier, send at most one of the matching signal, nearly-matching signal or absent signal. In an embodiment, the matching unit is arranged to, upon receiving the fuzzy input identifier, send exactly one of the matching signal, nearly-matching signal or absent signal.

The matching, nearly matching and absent criteria may be made mutually exclusive. The matching identifier may also be regarded as a nearly matching identifier, in which case matching unit 130 first establishes that no matching fuzzy identifier exists in the database according to the matching criterion, before deciding if the nearly matching criterion is satisfied.

In case the nearly matching criterion is found, the assigning device 100 neither returns a fixed identifier nor adds a new database record. Instead, matching unit 130 may send a resample-error message through the network interface, e.g., to the requesting device. The latter instructs the requesting device of the problem that has occurred, and suggests trying to resample the PUF. If the near match was due to chance, a new measurement may resolve the problem. If the near match was due to a high noise level, a new measurement may also resolve the problem, especially if the new measurement is taken with a lower noise level. Sending resample-errors in case a near match is found will reduce the likelihood of finding ambiguous situations, since fewer fuzzy identifiers are added which are relatively close together.

It is possible to restrict the adding of fuzzy identifier such that ambiguous situations are eliminated. In an embodiment of an assigning device 100 arranged for the second type, the distance function satisfies the triangle inequality, the matching criterion is satisfied if a distance between the matching fuzzy identifier and the fuzzy input identifier according to a distance function, is less-or-equal than a matching threshold, the nearly-matching criterion is satisfied if a distance between the nearly-matching fuzzy identifier and the fuzzy input identifier according to the distance function, is less-or-equal than a nearly-matching threshold, wherein the nearly-matching threshold is at least two times the matching threshold. If no match or near match is established the absence criterion is satisfied.

A distance function d satisfies the triangle inequality if for any inputs x, y and z we have $d(x,y) \leq d(x,z)+d(z,y)$. Many different distance functions satisfy the triangle inequality, including the Hamming distance.

Suppose the matching threshold is M, the nearly-matching threshold is NM. We assume that NM 2M. A fuzzy input identifier z matches a fuzzy identifier x if $d(x,z) \leq M$, and nearly matches if $d(x,z) \leq NM$. A fuzzy input identifier z is absent if for all x in the database, $d(x,z) > NM$.

As matching and nearly matching fuzzy identifiers are not added to the database, we have the property that $d(x,y) > NM$ for all fuzzy identifiers x and y in the database. We claim in this situation no fuzzy identifier can match two fuzzy identifiers in the database, thus eliminating the ambiguity problem. Suppose that for a fuzzy identifier z we have both $d(x,z) \leq M$ and $d(y,z) \leq M$, then we get a contradiction as $2M \geq d(x,z)+d(y,z) \geq d(x,y) > NM \geq 2M$.

Below we explain what happens if the fuzzy identifiers 310, 320, 312, 330 and 332 are received as fuzzy input identifiers when the matching unit 130 is configured as in the second type defined above, which does not always returns a fixed identifier. We assume the database is initially empty, but the same principles apply if the database contains multiple records.

As before the fuzzy identifiers are assumed to be bit strings of a fixed length—in the examples the bit string length is 20 bit. The matching criterion is satisfied if a distance between the matching fuzzy identifier and the fuzzy input identifier according to a distance function is less-or-equal than a matching threshold. In this example, the distance function is the Hamming distance. In the examples related to FIG. 3 the matching threshold is 4 and the nearly matching identifier is 8.

Fuzzy ID 310: Matching unit 130 does not find a matching fuzzy identifier and sends the absent signal to database adding unit 150, which in turn will add a first record containing fuzzy identifier 310. Database adding unit 150 sends a matching signal to the fixed identifier determiner 140. The fixed identifier determiner 140 determines a fixed identifier based on the added first record.

Fuzzy ID 320: Matching unit 130 determines that the distance with fuzzy identifier 310 is 9. As this is more than the matching threshold 4, no matching fuzzy identifier exists. As this is also more than the nearly matching threshold 8, no nearly matching fuzzy identifier exists. Thus a second record is a record is added for fuzzy identifier 320. A fixed identifier is returned based on the second record.

Fuzzy ID 312: Matching unit 130 determines that the distance with fuzzy identifier 310 is 4. Thus a matching fuzzy identifier exists in the database that matches the fuzzy input identifier. Matching unit 130 sends a matching signal to a fixed identifier determining unit 140. Fixed identifier determiner 140 sends a fixed identifier based on the first record.

Fuzzy ID 330: Matching unit 130 determines that the distances with fuzzy identifiers 310 and 320 are 6 and 11 respectively. Although both are larger than the matching threshold, we do have a near match between fuzzy input identifier 330 and fuzzy identifier 310. Accordingly a third record is not added for fuzzy ID 330. No fixed identifier is determined. Assigning device 100 may send a resample error to indicate the problem to the requesting device.

Fuzzy ID 332: There is exactly one matching fuzzy identifier since only the distance between fuzzy ID 332 and the fuzzy IDs 310 is less or equal than the matching threshold. In this case no ambiguous situation arises. A fixed identifier is returned based on the first record.

Assigning devices of the first and second types have different uses. An assigning device of the first type will always return a fixed identifier. This is advantageous in situations in which no provisions can be made to adapt to a missing fixed identifier. On the other hand, an assigning device of the second type will not always produce a fixed identifier, but if it does there is a better assurance that the returned fixed identifier will indeed correspond to the correct fuzzy identifier. The disadvantages are relative, as both the problems of the first type and of the second type can be made improbable by increasing PUF length.

Below as an example, calculations are performed for an embodiment of an assigning device 100 of the first type. In this case fuzzy IDs comprise binary data. Matching an input fuzzy ID with a database of already registered fuzzy IDs is done by computing the Hamming Distance between the input fuzzy ID and every fuzzy ID candidate stored in the database. For example, a brute-force database search may be done until an item is found whose Hamming Distance compared to the input fuzzy ID is smaller than a pre-defined threshold T, e.g., the matching threshold.

As a source of the fuzzy ID we can for example use SRAM startup values. Every bit cell of the SRAM has a preferred startup value that is determined by uncontrolled process variations at silicon manufacturing. Most of the bit cells have a stable startup value that is unique for the memory and the device, but some of the bit cells will produce different outputs every time, which causes the measurement to have noisy bits.

Let N denote the size of the Fuzzy ID in bits. Let $p_1$ denote the probability that a bit cell of the SRAM has a preference to start up as a 1, and $p_0=(1-p_1)$ the probability that the preferred startup bit is a 0. We can model the creation of a device unique bit string of preferred SRAM startup bits as drawing N bits from a binomial distribution with probability $p_1$. The noise in reading out the SRAM startup bits is modeled with a noise probability $p_e$.

The false rejection rate (FRR), or the probability of falsely rejecting a fuzzy ID measurement can then be computed as: $FRR=1-binocdf(T,N,p_e)$ wherein:

T is the Hamming Distance matching threshold: if the Hamming Distance between the measured fuzzy ID and the database candidate is smaller or equal than T, we conclude that the fuzzy IDs match N is the number of bits in the fuzzy ID bit string $p_e$ is the noise probability binocdf( ) is the cumulative binomial distribution function The false acceptance rate (FAR) or the probability of falsely matching a measured fuzzy ID with a fuzzy ID measurement from another device is computed as:

$FAR = binocdf(T, N, p_1)$

For an SRAM PUF we assume the worst-case noise to be 20% or $p_e=0.2$. We can then vary the values of T and N until we find a FRR and FAR that are sufficiently small such that a miss-match will never occur in practice. In an example embodiment, we want to make sure that both FRR and FAR are below 10^9. This means that the probability of falsely rejecting a measurement is less than 1 in a billion. The same holds for the probability of falsely accepting a measurement to be of a specific device.

The value of T can be used to tune the FRR versus the FAR. Increasing the value of T will lower the FRR, since the probability of falsely rejecting a fuzzy ID measurement will decrease as more deviation is allowed. At the same time the FAR will increase, since the probability that a fuzzy ID measurement matches with the wrong candidate fuzzy ID in the database is increased as more difference is allowed. When plotting the FRR and FAR for different values of threshold T and a fixed number of bits N, we can identify the point where the FRR equals the FAR. This point is called the Equal Error Rate.

Figure 7A:
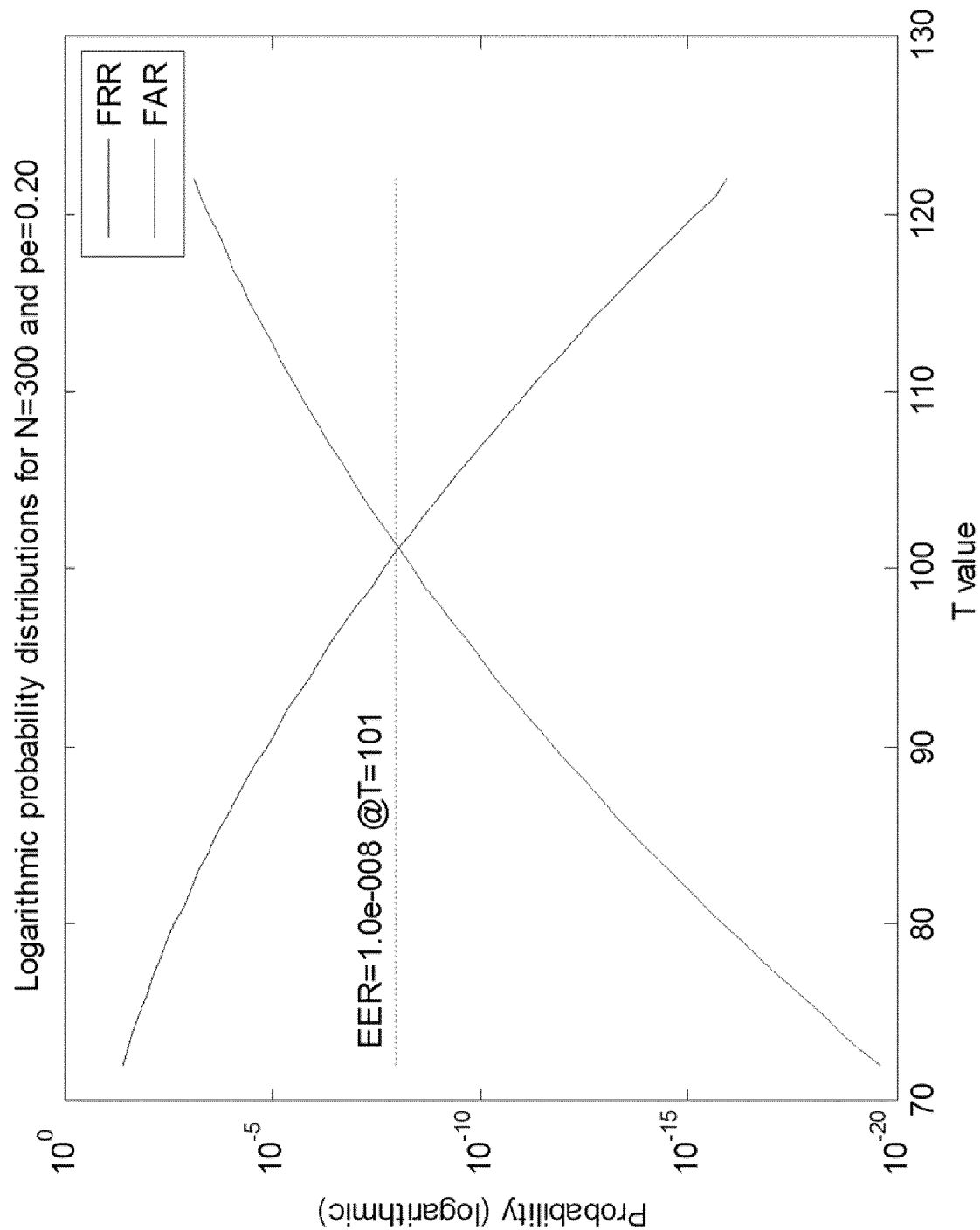
FIG. 7*a* is a graph showing failure probabilities (FRR and FAR) of an embodiment of a matching unit as a function of Hamming Distance matching threshold T for Fuzzy ID length N=300.
Figure 7B:
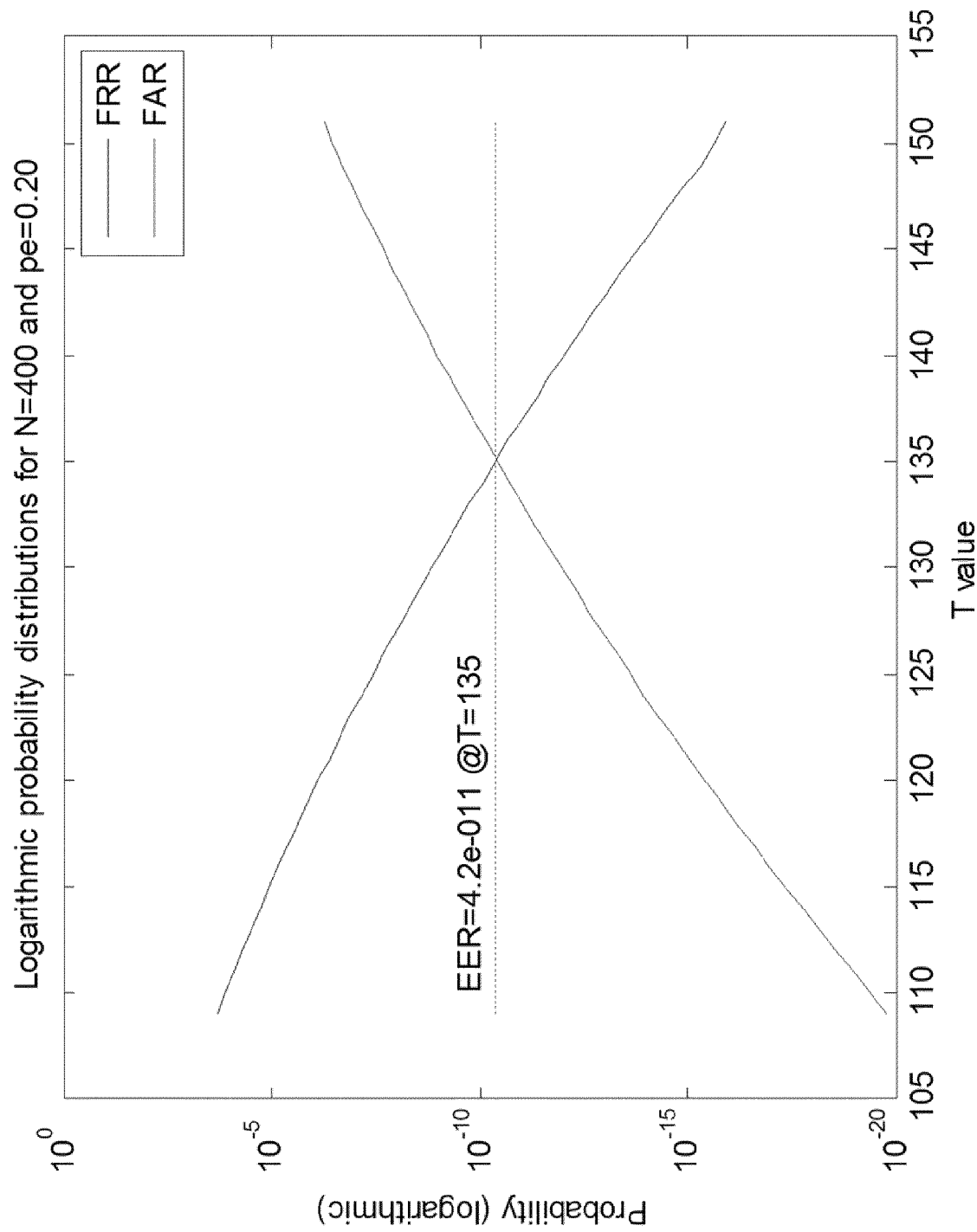
FIG. 7*b* is a graph showing failure probabilities (FRR and FAR) of an embodiment of a matching unit as a function of Hamming Distance matching threshold T for Fuzzy ID length N=400.
Figure 7C:
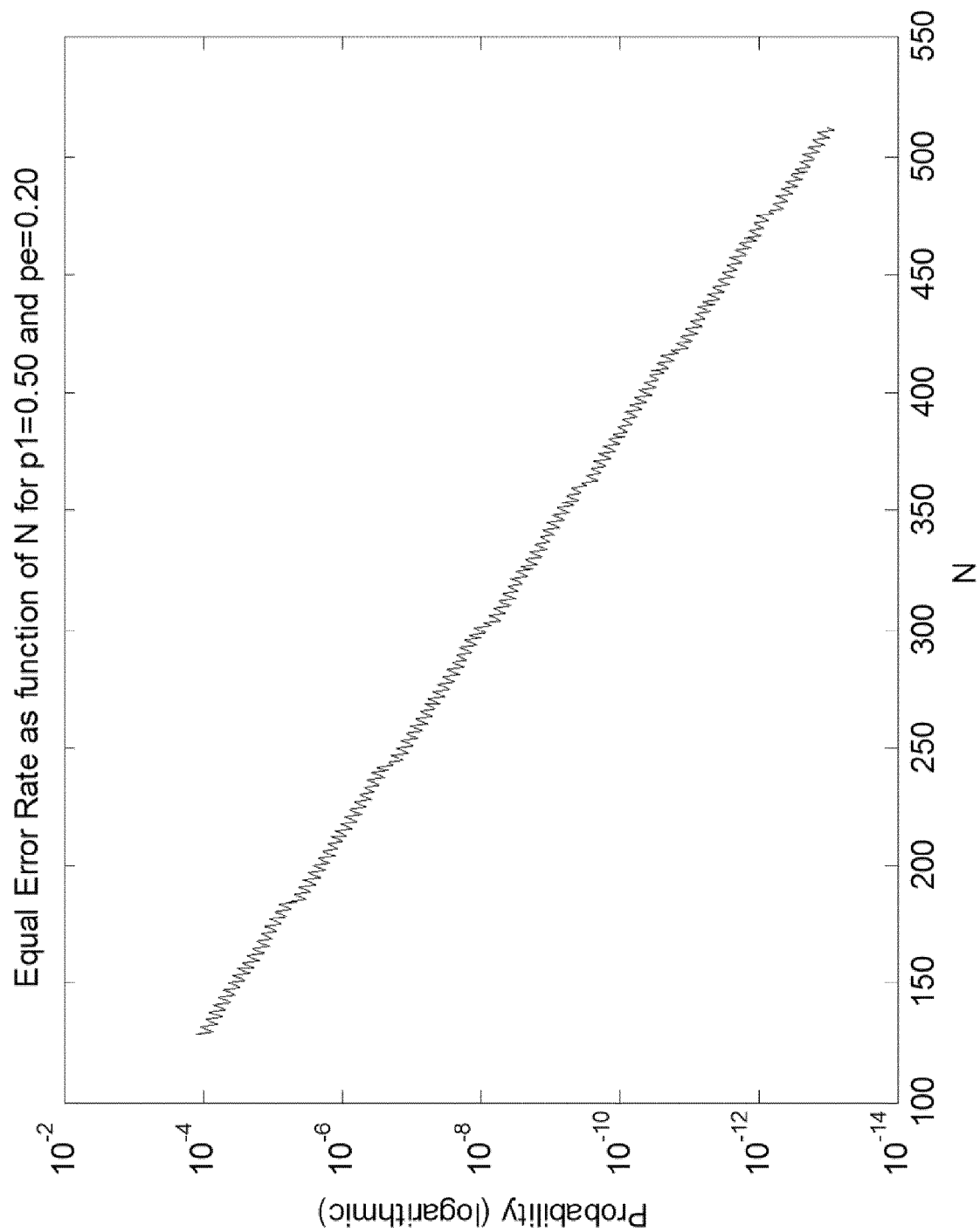
FIG. 7c is a graph showing achievable equal error rate (EER) of an embodiment of a matching unit as a function of Fuzzy ID length N, FIG. 8a schematically illustrates an embodiment of a matching unit, a database, and a pre-matching database.

As an example, for a fuzzy ID of size N=300 bits and error probability $p_e=0.2$, the FRR and FAR are plotted as function of matching threshold T in FIG. 7a. The EER (equal error rate) is achieved for matching threshold T=101 and amounts to EER=$1 \cdot 10^{-9}$. In order to achieve an equal error rate below $10^{-9}$, the size of the fuzzy ID needs to be increased. FIG. 7b shows the same graph but for a matching threshold of 400, here the achievable EER is lowered to $4.2 \cdot 10^{-11}$ for a fuzzy ID length of N=400. The achievable equal error rate as a function of the Fuzzy ID length N is plotted in FIG. 7c. In FIGS. 7a and 7b the FAR can be seen to increase as the T value increases, whereas the FRR decreases as the T value increases.

FIG. 4 schematically shows examples of database records. The database record shown each may result from adding fuzzy identifier 310 to database 110, e.g., by database adding unit 150. Each database record, except record 430, stores the fuzzy identifier 310. For example, in response to fuzzy identifier 312, a database record shown in FIG. 4 may be found by matching unit 130.

Database record 410 stores fuzzy identifier 310. Fixed identifier determiner 140 may determine a fixed identifier from database record 410 in a number of ways.

For example, the matching fuzzy identifier may be used as the fixed identifier. In this case fuzzy identifier 310 may be used as the fixed identifier. Fixed identifier determiner 140 may also use part of the fuzzy identifier 310 as the fixed identifier. A Fuzzy ID requires more bits than a fixed ID with the same identification capacity, as multiple fuzzy ID measurements, e.g. all that are within close distance, will map to the same fixed ID. Thus while preserving the identification power of a fuzzy identifier, the corresponding fixed identifier can be shortened considerably, e.g., as noise is removed.

For example, fixed identifier determiner 140 may be arranged to obtain a hash value by applying a hash function to at least the matching fuzzy identifier, the fixed identifier comprising at least part of the hash value. In particular, fixed identifier determiner 140 may use a cryptographic hash. For example, fixed identifier determiner 140 may apply a SHA-1, SHA-2, RIPEMD-160, etc, hash to fuzzy identifier 310. Fixed identifier determiner 140 need not use all of the output of the hash. For example, to obtain a 32 bit fixed identifier, the fixed identifier determiner 140 may use the first 32 bit of the hash output. The required length of the fixed identifier may depend on the number of different PUFs that expected to make use of assigning device 100. Using a hash function the resulting fixed identifier can be considerably shorter than the fuzzy identifier. A fixed identifier does not need to account for noise so a single differing bit is sufficient to distinguish sources. This means that the fixed identifier may be shorter than the fuzzy identifier. Moreover, a fuzzy identifier need not have full entropy. For example, the output of a memory based PUF may be biased, e.g., have a percentage of 1 bits different from 50%. As a hash is unbiased, the fixed identifier can be shorter than the fuzzy identifier to get the same entropy. Moreover, using a hash avoids having a persistent state at the assigning device, e.g., a serial number. The latter is especially convenient when multiple assigning devices use the same database 110.

FIG. 4 further shows example database record 420. Database record 420 comprises a fuzzy identifier, here fuzzy identifier 310 and a unique identification number 422. The unique identification number 422 is unique in the database. The fixed identifier may comprise or consist of the unique identification number. The database adding unit 150 may be arranged to determine the unique identification number when adding the database record.

A unique number can be even shorter than both using the fuzzy identifier or part of a hash value. In particular, in an embodiment the number of bits in the unique number is at most half the number of bits in the fuzzy identifier, more preferably at most ⅛. A serial number can be even shorter than a fixed identifier based on a hash function. As hash values essentially have a random connection with the fuzzy identifier, they must be long enough to avoid collisions. As a result of the so-called birth day paradox, the number of bits in the unique number can be about half shorter than in a random identification number.

The unique number may be a serial number. For example, database adding unit 150 may assign the number of already existing records as the unique number.

Database records may comprise additional information: for example, a timestamp indicating when the record was created, for example, the requesting device ID that caused the record to be added, etc.

In an embodiment, matching unit is 130 arranged to
upon determining that the matching fuzzy identifier exists in the database, store the fuzzy input identifier in the database record storing the matching fuzzy identifier, and to use said stored fuzzy input identifier for future determinations of matching and existence.

For example, in an embodiment, after finding a matching fuzzy identifier, matching unit 130 replaces the matching fuzzy identifier with the fuzzy identifier in the database record that stored the matching fuzzy identifier. As a result, when fuzzy identifiers are continually update so that they reflect the latest fuzzy identifier received from a PUF.

Some PUFs in particular memory based PUFs are subject to a phenomenon known as ageing. Some of the bits in the output of a PUF slowly change their preference for being 1 or 0. As a result the fuzzy identifier produced by a PUF drifts away too much from the original fuzzy identifier stored in database 110. Drift may at some point cause errors if the PUF has drifted away too much from the originally stored fuzzy identifier. By using the most recently obtained fuzzy identifier as a starting point for new matches, the database tracks the drifting of the PUF and avoids drift-based errors.

For example, FIG. 4 shows database record 430 which is an update of database record 410, e.g., after fuzzy identifier 312 has been received.

Instead of replacing a fuzzy identifier a database record may also store the original fuzzy identifier, e.g., the fuzzy identifier with which the database record was created and the most recently obtained fuzzy identifier. This option is shown in database record 440. New matches may use the new fuzzy identifier 312, but the original fuzzy identifier 310 can be used to determine the amount of drift. In an embodiment, database 110 is arranged to store both the original fuzzy identifier that was stored in the database record by the database adding unit in response to the absent signal, and the fuzzy input identifier stored in response to a matching signal. Assigning device 100 may comprise a drifting unit 160 arranged to determine a distance between the original fuzzy identifier and the stored fuzzy input identifier. If said distance is above a drifting threshold drifting unit 160 may send a drifting-error message. If the drift has become large, the corresponding PUF has become unreliable. This information may be returned to the requesting device. For example, the requesting device may receive a fixed identifier, but also the warning that the PUF may have become too unreliable. In response the requesting device may replace the PUF or otherwise take the PUF out of circulation. Alternatively, the drifting-error message may be send to a logging unit to track the quality of the PUFs in the system. The information in the logging system may for example be used to decide when the PUFs need to be replaced, or how to dimension future PUFs.

For example, the optional drifting device 160 may determine that the drift in record 440 is currently 4. Drift computation may use the same distance function as used for matching, though this is not needed.

In an embodiment, assigning device 100 comprises an error unit (not separately shown in FIG. 1) arranged to verify if an input received at the network interface is a fuzzy input identifier, and if the received input is not a fuzzy input identifier, send a bad-input error message through the network interface. For example, a fuzzy identifier may be received that is not formatted correctly. For example, a fuzzy identifier may be received which is shorter than a bit string length required by assigning device 100. The error unit may also be used to send other error messages, such as a drifting-error message and resample-error message.

Instead of executing a brute-force search in which the hamming distance is computed between the candidate fuzzy identifier (FID) and every item in the database, the search time can be improved on average by first computing hamming distances on a smaller subset of the bits from every FID. The search on a subset of bits will provide a list of plausible matches: database items for which the hamming distance with the same subset of bits from the candidate FID are below a threshold T2. A full Hamming Distance computation is then computed on these plausible matching FIDs. This will ultimately decide if there is a match with one of the Fuzzy IDs in the database. In case the plausible matches turn out not to match with the candidate or no plausible matches are found, the system may revert back to the brute force method and do a full search. Note that the worst-case search time may become longer with this method, but the average search time is reduced.

It is advantageous to choose the size of the subset in line with the data size of instructions that are supported by the processor on which the search algorithm runs, e.g., the register size, or a small multiple thereof, say twice that. For example, modern Intel processors work with 64-bit data words. Hence it is advantageous to take, e.g., 64-bit subsets on which efficient Hamming Distance operations can be computed using 64-bit XOR and popcnt( ) instructions. A reduced pre-matching database may be pre-computed and loaded into memory for fast access.

The threshold T2 needs to be chosen appropriately. A higher threshold value results in finding more plausible candidates, but on the other hand the probability that such a candidate turns out to be a no-match when checking the full FID is also higher. If T2 is chosen too small, the fast-search has a high probability of not detecting a plausible candidate. The probability of not detecting a plausible candidate is similar to the FRR as explained above and the probability of detecting plausible candidates that in the end turn out to be non-matching is similar to the FAR. Note that noise is reasonably randomly distributed over the bits of the FID. The above formulas can therefore be used to compute these values, adapting N to the number of selected bits. Some example settings for T2 are depicted in the table below, in which the bit length of the FID is 512 bit, the EER is 9.9e-14, the threshold is 173 bit, $p_e=0.2$, $p_1=0.5$, and the bit length of the selected bits (the first part of the FID) is 64 bit

| Threshold T2 | Probability of not detecting plausible candidate (FRR) | Probability of falsely detecting plausible candidates (FAR) |
| --- | --- | --- |
| 18 | 0.0421 | 0.000309 |
| 20 | 0.0110 | 0.0018 |
| 22 | 0.0022 | 0.0084 |
| 24 | 0.000351 | 0.0300 |
| 26 | 0.0000434 | 0.0843 |

It will typically not be required to match the "probability of not detecting plausible candidates" with the "probability of falsely detecting plausible candidates". Instead the "probability of not detecting plausible candidates" may be chosen smaller than the "probability of falsely detecting plausible candidates" because it is not a problem to discard the plausible candidates in a second step when the Hamming Distance is computed on the full FID.

Figures 8A, 8B, 8C, 8D, 8E:
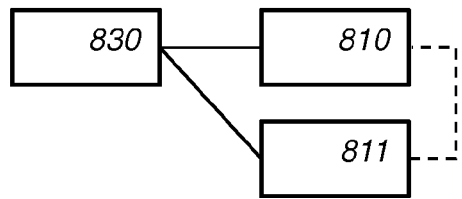
FIG. 8b illustrates part of a possible content of database 810.
FIG. 8c illustrates part of a possible content of a pre-matching database 811 that corresponds to database 810.
FIG. 8d illustrates part of possible pre-matching database 811'.
FIG. 8e illustrates an example of forming a pre-matching fuzzy input identifier.

FIG. 8a schematically illustrates an embodiment of matching unit 830, a database 810 and a pre-matching database 811. For example, matcher 830, database 810 and a pre-matching database 811 may be adopted in assigning device 100, e.g., as described in relation to FIG. 1, e.g., to replace matching unit 130, and database 110.

In this embodiment, the fuzzy identifiers stored in the database 810 each comprise a first part, the first part being smaller than the full corresponding fuzzy identifier. For example, FIG. 8b shows part of a possible content of database 810. Shown are 4 database records, labeled as records 01, 02, 03, and 04. For example, in another part of database 810 further information corresponding to records 01, 02, 03, and 04 may be stored, e.g., a corresponding fixed identifier, etc. In this example, the fuzzy identifiers stored in database 810 are represented in hexadecimal numbers, although in this example matching will be done on the bits, e.g., by hamming distance.

Of the fuzzy identifiers stored in database 810 only the first 24 bytes are shown. Actual fuzzy identifiers may be longer, e.g., 50 bytes or 64 bytes, etc. In FIG. 8b the first parts of the fuzzy identifiers are underlined. For example, a fuzzy identifier may be 64 bytes long and the first part may be 8 bytes long (64 bits). In an embodiment, the fuzzy identifiers are bit strings, and the first part is a predetermined subset of the bits in the bit string. In this case the predetermined subset of the bits is formed by 8 selected bytes, e.g., bytes with index 8i, when the bits are numbered from 0 to 63, and $0 \leq i \leq 7$.

Matching unit 830 is arranged to pre-select fuzzy identifiers in the database for which a first part of the fuzzy input identifier matches a first part of the fuzzy input identifier according to a pre-matching criterion. This may be done without a separate pre-matching database 811, for example, by comparing a first part of the fuzzy input identifier with all records in database 810. The latter will likely work best if the first part of the fuzzy identifier is aligned with the computer architecture of assigning system 100. For example, the first part may be taken as a section of consecutive bits at the start or finish of a bit-string. Thus pre-matching database 811 is optional.

On the other hand, the first parts of the fuzzy identifiers in database 810 may be stored in a separate pre-matching database 811. Matching unit 830 is arranged to first select the first parts of the fuzzy identifiers in pre-matching database 830 for which a first part of the fuzzy input identifier matches the first part of the fuzzy input identifier according to a pre-matching criterion.

FIG. 8c illustrates part of a possible content of a pre-matching database 811 that corresponds to database 810. Shown in database 811 are the first parts (underlined parts) in database 810. As the first part of a fuzzy identifier is shorter than the full fuzzy identifier comparing with the input fuzzy identifier is faster. By selecting the pre-matching criterion sufficiently generous it can be made improbably or even avoided that the correct fuzzy identifier is not in the pre-selection. Note that if a full matching is run on the full database in case of a failed identification, the pre-matching criterion may be made tighter which may reduce average run time more, than if the pre-matching criterion is sufficiently broad to nearly guarantee that the correct match will be in the selection.

After matching unit 830 selected fuzzy identifiers in pre-matching database 811, the corresponding records in database 810 may be retrieved. For example, in the example shown in FIGS. 8b and 8c, both have numbered records. The numbering in database 810 in FIG. 8b corresponds with the numbering in pre-matching database 811 in FIG. 8c.

Either with or without the help of a separate pre-matching database, matching unit 830 arrives at a list of potential matches. Said list is smaller than the full database, yet likely contains the correct match. Matching unit 830 now determines if a matching fuzzy identifier exists in said pre-selected fuzzy identifiers according to the matching criterion. In this case the matching criterion may be evaluated over the full fuzzy identifier or only over the remaining part of the fuzzy identifier, e.g., the fuzzy identifier without its first part.

Fuzzy identifiers obtained from PUFs have a distribution that is sufficiently even over the length over of the fuzzy identifier that this approach will reduce the time to find a matching fuzzy identifier in a database.

The time required to search for a matching database can be further reduced by matching multiple fuzzy identifiers in database 810 with a fuzzy input identifier at the same time. For example, this can be achieved by deriving from the main list of FIDs a list of 64-bit entries comprising selected bits from multiple FIDs in database 810. The same selection of bits is made from the candidate FID and repeated to fill up, say, a 64-bit search bitstring.

A different Hamming distance threshold T3, is used in this case to detect plausible matches. Furthermore, once a plausible match is found, either select both corresponding FIDs or one may further check whether the first part or the second part of the bit string induced the match, and then restrict the full matching to the corresponding FID or FIDs that caused the match.

In an embodiment, pre-matching database 811 stores multiple database records, each database record storing a pre-matching fuzzy identifier, said pre-matching fuzzy identifier comprising a first part of at least two different fuzzy identifiers stored in the database. An example of such a pre-matching database has been shown in FIG. 8d showing part of pre-matching database 811'. Shown in pre-matching database 811' are records which contain the first part of two different FIDs in database 810, shown in FIG. 8b. For example, the record 0102 corresponds to database records 01 and 02 of database 810. If the records in databases 811 and 811' are of the same length, say of 64 bit, then database 811' will use a shorter first part. For example, database 810 in FIG. 8c may have 64 bits of each 512 FID, whereas database 811 in FIG. 8d may have 32 bits of each 512 bit FID, combined in pairs to form 64 bit records.

Matching unit 830 is arranged to generate a pre-matching fuzzy input identifier comprising at least twice the first part of the fuzzy input identifier. For example, a record in the pre-matching database 811' may be formed by combining, say concatenating, a first part formed from a predetermined subset of the bits in the bit string in a first FID, and a first part formed from the predetermined subset of the bits in the bit string in a second FID.

The pre-matching fuzzy input identifier may be formed in the same way by combining, say concatenating, a first part formed from the predetermined subset of the bits in the bit string in fuzzy input identifier, and the same first part formed from the predetermined subset of the bits in the bit string in fuzzy input identifier.

FIG. 8e gives an example of forming the pre-matching fuzzy input identifier. Shown is a fuzzy input identifier at reference sign 820. The first part of fuzzy input identifier 820 has been indicated by underlining. Pre-matching fuzzy input identifier 821 is formed by taking the first part of fuzzy input identifier 820 twice.

Matching unit 830 determines pre-matching fuzzy identifiers in the pre-matching database for which the pre-matching fuzzy input identifier matches the pre-matching fuzzy input identifier according to a further pre-matching criterion. For example, by comparing pre-matching fuzzy input identifier 821 with the records in database 811' it is found that record 0304 gives a match. As lengths of the first parts are shorter here the further pre-matching criterion needs to be adapted to a smaller value than for database 811 in FIG. 8c. Moreover, the as the bit string is shorter, more allowance needs to be made to make sure the correct matching FID is captured.

Finally, the matching unit 830 determines if a matching fuzzy identifier exists in the fuzzy identifiers in the database which corresponds to the determined pre-matching fuzzy identifiers.

For example, after matching unit 830 found that record 0304 matching pre-matching fuzzy input identifier 821, matching unit 830 may first find which part of record 0304 caused the match, in this case the part corresponding to record 04 in database 810. Next the matching unit 830 may compare fuzzy input 820 with record 04. This is preferable, as it will half the number of comparisons that have to be made in database 810. However, it is also possible to skip this step and compare fuzzy input 820 with both records (03 and 04) that correspond to record 0304.

It is noted that the search speed of finding matching identifiers may further be improved by choosing specialized hardware. For example, instead of executing the Hamming Distance comparisons on a regular processor (CPU) we can make use of Graphical Processing Units (GPUs), which combine multiple cores that can execute code in parallel and have a large amount of internal working memory. Furthermore, processors with a high memory bandwidth are advantageous, since memory access is often the limiting factor in obtaining execution speeds.

Below two advantageous assigning devices are disclosed with need not necessary have an adding unit or fixed identifier determiner.

An assigning device for assigning fixed identifiers to fuzzy identifiers, the assigning device comprising a database storing multiple database records, each database record storing a fuzzy identifier, an interface arranged to receive a fuzzy input identifier, and a matching unit arranged to determine if a matching fuzzy identifier exists in the database that matches the fuzzy input identifier according to a matching criterion, and thereupon sending a matching signal to a fixed identifier determining unit.

In an embodiment of this assigning device, the fuzzy identifiers in the database each comprise a first part, the first part being smaller than the full corresponding fuzzy identifier, and the matching unit is arranged to pre-select fuzzy identifiers in the database for which a first part of the fuzzy input identifier matches a first part of the fuzzy input identifier according to a pre-matching criterion, and determine if a matching fuzzy identifier exists in said pre-selected fuzzy identifiers according to the matching criterion.

An embodiment of this assigning device comprises a pre-matching database storing multiple database records, each database record storing a pre-matching fuzzy identifier, said pre-matching fuzzy identifier comprising a first part of at least two different fuzzy identifiers stored in the database, the matching unit being arranged to generate a pre-matching fuzzy input identifier comprising at least twice the first part of the fuzzy input identifier, determine pre-matching fuzzy identifiers in the pre-matching database for which the pre-matching fuzzy input identifier matches the pre-matching fuzzy input identifier according to a further pre-matching criterion, and determine if a matching fuzzy identifier exists in the fuzzy identifiers in the database which correspond to the determined pre-matching fuzzy identifiers.

FIG. 2a schematically shows an example of an embodiment of an object identifying system 200. The object identifying system 200 comprises an embodiment of assigning device 100 and at least one reader. FIG. 2a shows readers 250, and 252. There may be more than 2 readers, there may also be only one.

FIG. 2a shows objects 210, 220 and 230. Each object has an associated PUF, 212, 222 and 232 respectively. The PUF may be comprised in the objects. For example, the objects may be digital chips comprising a memory based PUF. The PUF may also be otherwise associated with the object; for example, the PUF may be embedded in packaging of the object. The physical unclonable functions may be attached to the objects. The latter options are for example suitable for tracking objects to prevent counterfeiting.

Readers 250 is arranged to read fuzzy identifiers from the physical unclonable functions associated with the objects. For example, reader 250 can read PUF 212. A fuzzy identifier identifies a physical unclonable function and is subject to noise. A fuzzy identifier may be a PUF response.

Reader 250 comprises a network interface 251 arranged to send a read fuzzy identifier as a fuzzy input identifier to the network interface of the assigning device and receive the fixed identifier therefrom. Reader 252 is similar to reader 250. Readers 250 and 252 are arranged to make a first connection 262 and 264 with the objects 210-230. The reading connection 262 and 264 may be optical reading. The reading connection 262 and 264 may be an electric connection. For example, the first connection may be a connection to an interface of objects 210-230 to receive the response of a PUF. Said interface may be passive or active, for example, the reader may directly read out a PUF, say a memory, of the object through the interface. Alternatively, the reader may send a request for the PUF response; the objects may be arranged to upon receiving said request to send the PUF response.

During operation one of the readers, say reader 250 reads the PUF response of PUF 212 for the first time. The connection between reader 250 and object 210 is indicated at reference 262. Reader 250 sends the fuzzy identifier that was so obtained to assigning device 100 and receives a fixed identifier in return. The connection between reader 250 and assigning device 100 is indicated at reference 263.

Reader 250 may use the fixed identifier to identify PUF 212 and the associated object 210. For example, reader 250 may store information regarding object 210 in a further database different from database 110 together with the fixed identifier. For example, in a tracking application reader 250 may store the fixed identifier in a database together with a time stamp to indicate that object 210 was at reader 210 at particular time.

Later the same object may be again at reader 250 or at reader 252. For example, reader 252 may read out PUF 212, thus obtaining a fuzzy identifier. The connection between reader 252 and object 210 is indicated at reference 266. Reader 252 sends the fuzzy identifier to assigning device 100 and receives the same fixed identifier as reader 250 did. The connection between reader 252 and assigning device 100 is indicated at reference 265. For example, reader 252 may also store information with the fixed identifier, or it may retrieve the information stored by reader 250, etc.

Readers 250 and 252 may be arranged to read the fuzzy identifier from the physical unclonable function again upon receiving the resample-error message.

Figure 2B:
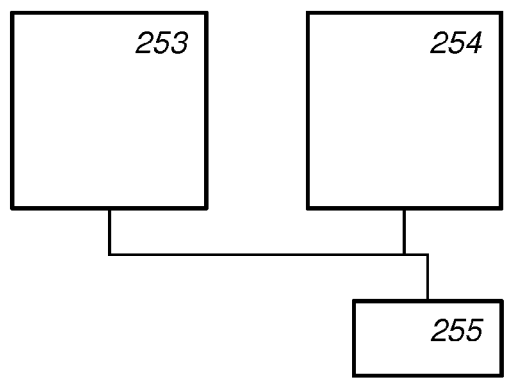

In an application of object identification system 200 as a testing system, reader 250 is comprised in a testing device 253 show in FIG. 2b. The testing device is arranged to test the objects 210, 220, 230. For example, the testing device may be part of a manufacturing process, in which testing device 252 performs tests on manufactured goods, e.g., computer chips. For example, the computer chips may be tested even while comprised in a manufactured wafer, before cutting said wafer.

Testing device 252 stores testing information of the objects together with the fixed identifier. For example, testing device 252 may store testing information in a database 255 using the fixed identifier as an index. Testing information may include, e.g., timestamp, test location, testing apparatus, waver number, batch number, and the like. Testing information may also include test results.

The testing system also comprises a retrieving device 254. Retrieving device 254 comprises a further reader, e.g. reader 252 arranged to read a further fuzzy identifiers from the physical unclonable functions, and a network interface arranged to send a read further fuzzy identifier as a fuzzy input identifier to the network interface of the assigning device and receive the fixed identifier therefrom. For example, retrieving device 254 may retrieve the testing information of the objects through the fixed identifier.

If at some point after manufacture a malfunction is found in a manufactured device, the further reader may recover the fixed identifier of the malfunctioning device. Using the fixed identifier, the testing information may be obtained using the fixed identifier as the index in the database. Using the testing information an informed decision may be made regarding the follow-up, e.g., a recall of affected devices, etc.

The testing system may be used for testing many types of objects, e.g., medicine, electronic devices, etc. As a further example, below a testing system for integrated circuits is further disclosed. For example, the testing system may be a testing system for testing dies in a wafer. A die is an integrated circuit on which a given functional circuit is fabricated. The dies are produced in large batches on a single wafer of electronic-grade silicon (EGS) or other semiconductor, e.g. GaAs, through processes such as photolithography. The wafer is cut into many pieces, each containing one copy of the circuit. Each of these pieces is called a die.

A wafer prober may be used to perform testing of the dies in a wafer, before the wafer is cut. Wafer testing is a step performed during semiconductor device fabrication. During this step, performed before a wafer is sent to die preparation, all individual integrated circuits that are present on the wafer are tested for functional defects by applying special test patterns to them. The wafer prober may make a direct electric connection or a wireless connection to the die. For example, the wafer prober may test the dies in turn; when a die has been electrically tested the wafer prober moves the wafer to the next die and the next test can start.

The wafer prober executes one or more test patterns on the die. The wafer prober also reads out a PUF comprised in the die. The wafer prober uses an assigning device 100, e.g., over a network, to obtain a fixed identifier for the die. The wafer prober then stores testing information, e.g., batch number, timestamp, test results etc, together with the fixed identifier.

After IC packaging, a packaged chip may be tested again during an IC testing phase, e.g. using the same or similar test patterns. This testing may be done by a packaged IC tester. The tester may be arranged to read out the PUF of the packaged IC, obtain a fixed identifier through the assigning device. The tester stores testing information, e.g., a timestamp, a batch number, test results, etc, together with the fixed identifier.

Later when the chip is deployed, the PUF can be read out again and a fixed identifier can again be obtained. The information stored during manufacture by the wafer prober and/or packaged IC tester may be retrieved using the fixed identifier.

Typically, assigning device 100, readers 250, 252, testing device 253 and retrieving device 254 each comprise a microprocessor (not separately shown in FIGS. 1-4) which executes appropriate software stored at these devices; for example, that software may have been downloaded and/or stored in a corresponding memory, e.g., a volatile memory such as RAM or a non-volatile memory such as Flash (not separately shown). The objects 210, 220, 230 may also be equipped with microprocessors and memories (not separately shown). Alternatively, the devices may, in whole or in part, be implemented in programmable logic, e.g., as field-programmable gate array (FPGA). They may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

An assigning device 100 may be implemented on a single computer, e.g., a server. Assigning devices may also be implemented in a distributed fashion. For example, database 110 may be implemented on a different computer, then matching unit 130.

In an embodiment, assigning device 100 comprises a network interface circuit, a matching circuit, a fixed identifier determining circuit, a database adding circuit. Device 100 may additionally comprise a drifting circuit. Assigning device 100 may also comprise a database circuit. The database may be implemented as a connection to a database external to the assigning device. The circuits implement the corresponding units described herein. The circuits may be a processor circuit and storage circuit, the processor circuit executing instructions represented electronically in the storage circuits. The circuits may also be FPGA, ASIC or the like.

The matching signal, absent signal and nearly-matching signal may be implemented as digital signals. For example, they may be implemented as electronic signals representing said signal. For example, they may be represented as digital signals sent over an interconnect, e.g., a bus. For example, a signal may be represented as a so-called jump to a particular memory address.

Figure 5A:
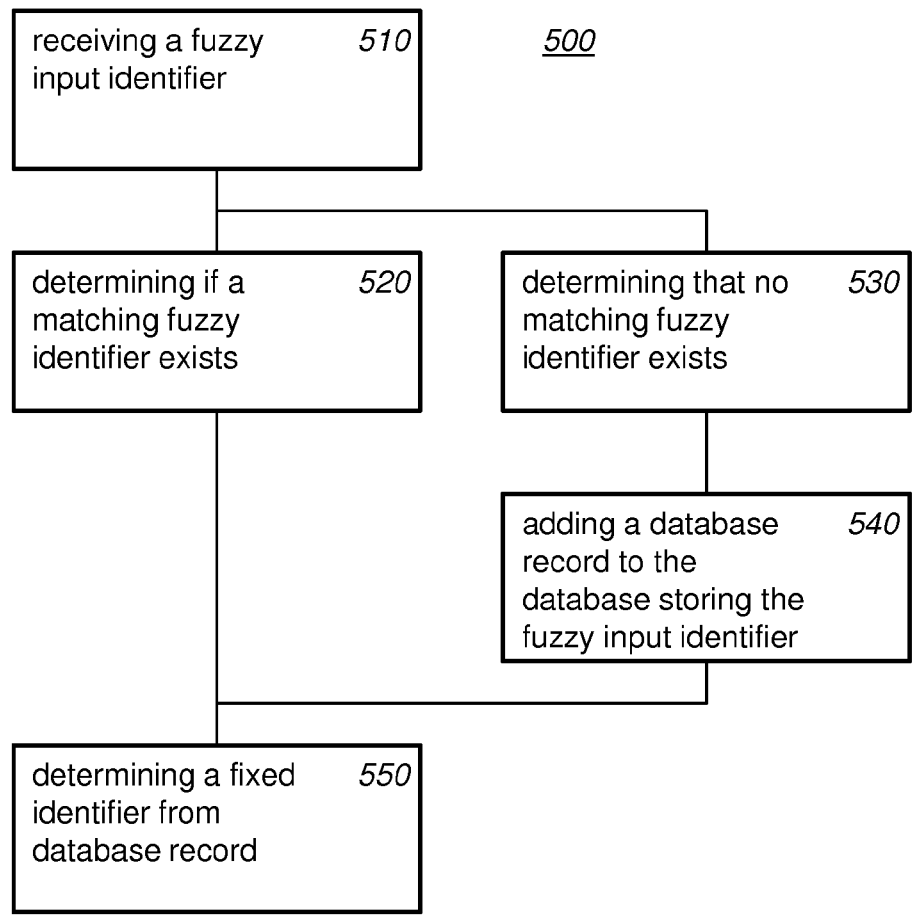

FIG. 5a schematically shows a flowchart illustrating an example of an embodiment of an assigning method 500. Assigning method 500 comprises
  receiving 510 a fuzzy input identifier,
  determining 520 if a matching fuzzy identifier exists in the database that matches the fuzzy input identifier according to a matching criterion, the database storing multiple database records, each database record storing a fuzzy identifier,
  determining 530 if a matching fuzzy identifier does not exist in the database according to an absent criterion,
  adding 540 a database record to the database if a matching fuzzy identifier does not exist in the database according to an absent criterion, said added database record storing the fuzzy input identifier,
  determining 550 a fixed identifier from the database record storing the matching fuzzy identifier, if the matching fuzzy identifier exists and also if the database record storing the fuzzy input identifier is added to the database.

Figure 5B:
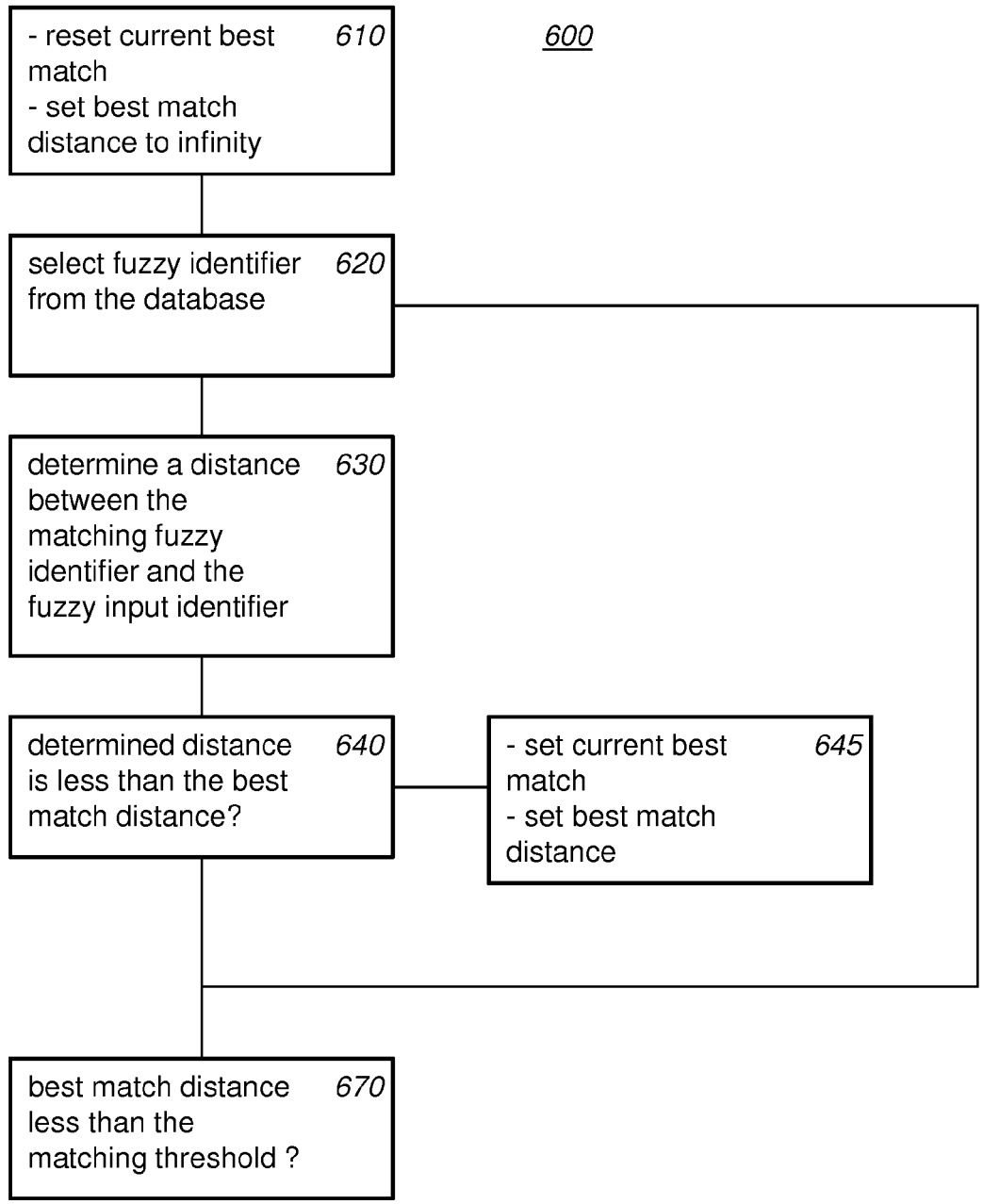

FIG. 5b schematically shows a flowchart illustrating a method 600 for determining that matching fuzzy identifier exists. Method 600 may be used to implement elements 520 and 530 in method 500.

Method 600 comprises
  resetting 610 a current best match and setting a best match distance to infinity. Infinity is large number, larger than is expected to occur for distances. For example, the infinity may be taken as the bit string length in case the hamming distance is used,
  selecting 620 fuzzy identifiers from the database until all fuzzy identifiers have been selected
    for each selected fuzzy identifier
    determining 630 a distance between the matching fuzzy identifier and the fuzzy input identifier according to a distance function, if the determined distance is less than the best match distance 640 set 645 the current best match to the selected fuzzy identifier; for example, the current best match may be a pointer to the record containing the selected fuzzy identifier, or the current best match may be a record id, etc.
  compare 670 the best match distance with the matching threshold.

If the best match distance is less than the matching threshold it is determined that a matching fuzzy identifier exists. For example, the matching signal may be sent. The current best match at the end of the search may be used to determine the fixed identifier.

In case of an assigning method of the first type, if the best match distance is not less than the matching threshold it is determined that no matching fuzzy identifier exists. In the latter case, e.g., the absent signal may be sent.

In case of an assigning method of the second type, if the best match distance is less than the near match threshold, a near match has been determined. For example, the resample error message may be sent. If neither a match nor a near match was found, it is determined that the no matching fuzzy identifier exists.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 500 or 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
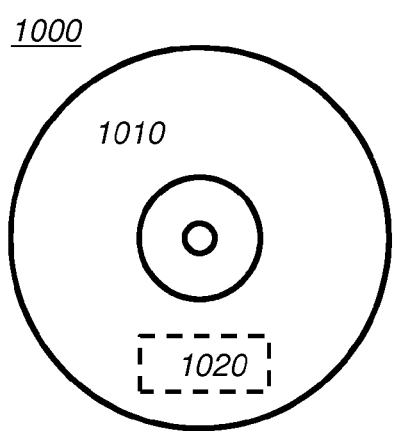

FIG. 6a shows a computer readable medium 1000 having a writable part 1010 comprising a computer program 1020, the computer program 1020 comprising instructions for causing a processor system to perform an assigning method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said assigning method.

Figure 6B:
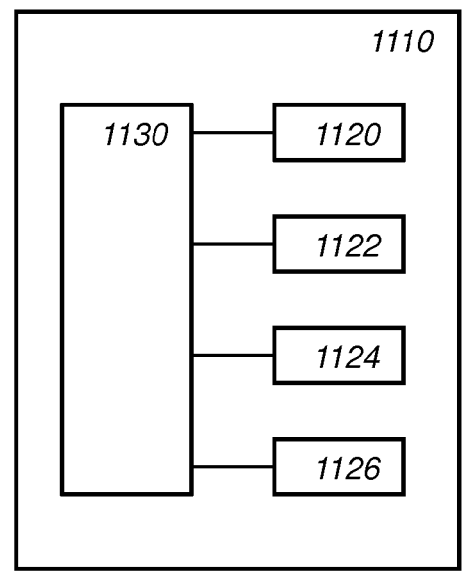

FIG. 6b shows in a schematic representation of a processor system 1140 according to an embodiment. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

Processor system 1140 may be arranged as an assigning device 100, or as a reader 250 etc.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An assigning device, comprising:
   a database storing multiple respective database records for respective physically unclonable functions, the multiple database records storing respective fuzzy identifiers, the respective fuzzy identifiers being noisy responses of the respective physically unclonable functions;
   a network interface that receives a fuzzy input identifier, the fuzzy input identifier being a noisy response of a first physically unclonable function; and
   a processor system that searches for the received fuzzy input identifier among the multiple database records in the database, and assign a fixed identifier to the first physically unclonable function based on the searching, wherein searches for different fuzzy identifiers that are noisy responses of the first physically unclonable function result in assigning the same fixed identifier to the first physically unclonable function;
   wherein the network interface further transmits the assigned fixed identifier, wherein the assigned fixed identifier uniquely identifies the first physically unclonable function.

2. The assigning device as in claim 1, wherein the processor system further:

determines if a matching fuzzy identifier exists among the multiple database records of the database that matches the fuzzy input identifier according to a matching criterion; and if a matching fuzzy identifier exists, determines the fixed identifier from the database record storing the matching fuzzy identifier, and assigns the determined fixed identifier to the first physically unclonable function.

3. The assigning device as in claim 2, wherein the processor system further:

if no matching fuzzy identifier exists among the multiple database records of the database that matches the fuzzy input identifier according to the matching criterion, determines if a nearly-matching fuzzy identifier exists among the multiple database records of the database that is nearly-matching to the fuzzy input identifier according to a nearly-matching criterion; and if the nearly-matching fuzzy identifier exists, sends a resample-error message through the network interface.

4. The assigning device as in claim 3, wherein:

the matching criterion is satisfied if a distance between the matching fuzzy identifier and the fuzzy input identifier according to a distance function, is less-or-equal than a matching threshold, the distance function satisfying a triangle inequality; and the nearly-matching criterion is satisfied if a distance between the nearly-matching fuzzy identifier and the fuzzy input identifier according to the distance function, is less-or-equal than a nearly-matching threshold.

5. The assigning device as in claim 2, wherein the processor system further:

obtains a hash value by applying a hash function to at least the matching fuzzy identifier, the fixed identifier comprising at least part of the hash value.

6. The assigning device as in claim 2, wherein the fixed identifier comprises at least part of the matching fuzzy identifier.

7. The assigning device as in claim 2, wherein the processor system further:

upon determining that the matching fuzzy identifier exists in the database, stores the fuzzy input identifier in the database record storing the matching fuzzy identifier; and use the stored fuzzy input identifier for future determinations of matching or existence.

8. The assigning device as in claim 7, wherein:

the database is configured to store both an original fuzzy identifier stored in the database record by the processor system in an absent determination, and the stored fuzzy input identifier; and the processor system further:

determines a distance between the original fuzzy identifier and the stored fuzzy input identifier; and if the said distance is above a drifting threshold, sends a drifting-error message.

9. The assigning device as in claim 2, wherein:

the matching criterion is satisfied if a distance between the matching fuzzy identifier and the fuzzy input identifier according to a distance function, is less-or-equal than a matching threshold; and the processor system further:

determines a closest fuzzy identifier among the multiple database records of the database which minimizes the distance to the fuzzy input identifier; and if the distance between the closest fuzzy identifier and the fuzzy input identifier is less than the matching threshold, determines the matching.

10. The assigning device as in claim 2, wherein:

the fuzzy identifiers in the database each comprise a first part, the first part being smaller than the full corresponding fuzzy identifier; and the processor system further:

pre-selects fuzzy identifiers in the database for which a first part of the fuzzy input identifier matches a first part of the fuzzy input identifier according to a pre-matching criterion; and determine if a matching fuzzy identifier exists in the pre-selected fuzzy identifiers according to the matching criterion.

11. The assigning device as in claim 1, wherein the processor system further:

determines if a matching fuzzy identifier does not exist among the multiple database records of the database according to an absent criterion; and if the matching fuzzy identifier does not exist:

adds a database record to the database for the first physically unclonable function, wherein the added database record stores the fuzzy input identifier; and determines the fixed identifier from the added database record, and assigns the determined fixed identifier to the first physically unclonable function.

12. The assigning device as in claim 11, wherein:

each database record further stores a unique identification number;

the processor system further stores a unique identification number in the added database record, the unique identification number being unique in the database; and the fixed identifier comprises the unique identification number from the database record.

13. The assigning device as in claim 1, further comprising:

a pre-matching database storing multiple database records, the multiple database records storing pre-matching fuzzy identifiers, the pre-matching fuzzy identifiers comprising a first part of at least two different fuzzy identifiers stored in the database; and the processor system further:

generates a pre-matching fuzzy input identifier comprising at least twice the first part of the fuzzy input identifier;

determines pre-matching fuzzy identifiers in the pre-matching database for which the pre-matching fuzzy input identifier matches the pre-matching fuzzy input identifier according to a further pre-matching criterion; and determines if a matching fuzzy identifier exists in the fuzzy identifiers in the database which correspond to the determined pre-matching fuzzy identifiers.

14. An object identifying system comprising:

the assigning device as in claim 1;

a reader configured to read fuzzy identifiers from physical unclonable functions, a fuzzy identifier identifying a physical unclonable function and being subject to noise, the physical unclonable functions being associated with objects, the reader comprising:

a network interface configured to send a read fuzzy identifier as a fuzzy input identifier to the network interface of the assigning device and receive the fixed identifier therefrom.

15. The object identifying system as in claim 14, wherein:

the assigning device is configured to:

if no matching fuzzy identifier exists among the multiple database records of the database that matches the fuzzy input identifier according to a matching criterion, determine if a nearly-matching fuzzy identifier exists among the multiple database records of the database that is nearly-matching to the fuzzy input identifier according to a nearly-matching criterion; and if the nearly-matching fuzzy identifier exists, send a resample-error message through the network interface; and the reader is configured to read the fuzzy identifier from the physical unclonable function again upon receiving the resample-error message.

16. A testing system comprising the system as in claim 14 and further comprising a testing device, and a retrieving device, wherein:

the testing device is configured to test the objects, the reader being comprised in the testing device, the reader of the testing device being configured to read the fuzzy identifiers during testing of the objects, the testing device storing testing information of the objects together with the fixed identifier; and the retrieving device comprises:

a further reader configured to read further fuzzy identifiers from the physical unclonable functions; and a network interface configured to send a read further fuzzy identifier as a fuzzy input identifier to the network interface of the assigning device and receive the fixed identifier therefrom.

17. The testing system as in claim 16, wherein the testing device is a wafer prober.

18. An assigning system for assigning fixed identifiers to a plurality of objects, the assigning system comprising the assigning device according to claim 1, an object of the plurality of objects comprising a physically unclonable function configured to generate a noisy response for use as a fuzzy identifier, the assigning device being configured for assigning fixed identifiers to the plurality of objects and their physically unclonable functions.

19. A method comprising:

receiving, via a network interface, a fuzzy input identifier, the fuzzy input identifier being a noisy response of a first physically unclonable function;

searching for the received fuzzy input identifier among multiple database records in a database, the multiple database records storing respective fuzzy identifiers, the respective fuzzy identifiers being noisy responses of respective physically unclonable functions;

assigning, by a processor system, a fixed identifier to the first physically unclonable function based on the searching, wherein searches for different fuzzy identifiers that are noisy responses of the first physically unclonable function result in assigning the same fixed identifier to the first physically unclonable function; and returning, via the network interface, the assigned fixed identifier as a unique identifier for the first physically unclonable function.

20. The method as in claim 19, wherein assigning the fixed identifier to the first physically unclonable function comprises:

determining if a matching fuzzy identifier exists among the multiple database records of the database that matches the fuzzy input identifier according to a matching criterion; and if a matching fuzzy identifier exists, determining the fixed identifier from the database record storing the matching fuzzy identifier, and assigning the determined fixed identifier to the first physically unclonable function.

21. The method as in claim 19, wherein assigning the fixed identifier to the first physically unclonable function comprises:

determining if a matching fuzzy identifier does not exist among the multiple database records of the database according to an absent criterion; and if a matching fuzzy identifier does not exist:

adding a database record to the database for the first physically unclonable function, the added database record storing the fuzzy input identifier; and determining the fixed identifier from the added database record, and assigning the determined fixed identifier to the first physically unclonable function.

22. A non-transitory computer readable medium comprising a computer program, the computer program comprising computer program instructions, wherein the computer program upon execution by a processor system causes the processor system to operate by:

receive, via a network interface, a fuzzy input identifier, the fuzzy input identifier being a noisy response of a first physically unclonable function;

search for the received fuzzy input identifier among multiple database records in a database, the multiple database records storing respective fuzzy identifiers, the respective fuzzy identifiers being noisy responses of respective physically unclonable functions;

assigning a fixed identifier to the first physically unclonable function based on the searching, wherein searches for different fuzzy identifiers that are noisy responses of the first physically unclonable function result in assigning the same fixed identifier to the first physically unclonable function; and returning, via the network interface, the assigned fixed identifier as a unique identifier for the first physically unclonable function.

\* \* \* \* \*